Patented Oct. 25, 1927.

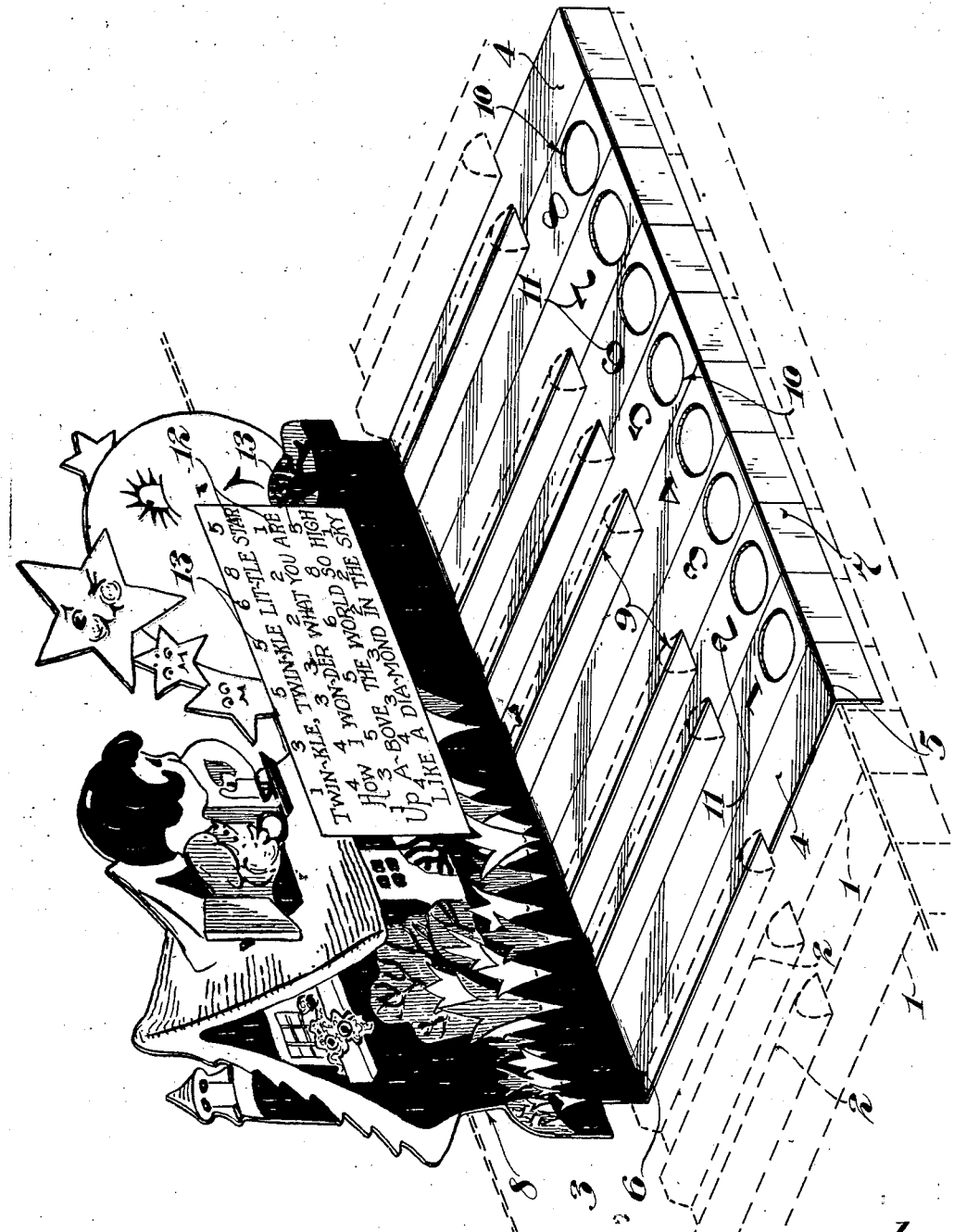

1,646,574

UNITED STATES PATENT OFFICE.

GEORGE E. BUZZA, OF MINNEAPOLIS, MINNESOTA.

PIANO-PLAYING GUIDE.

Application filed November 22, 1926. Serial No. 149,978.

My present invention has for its object to provide a new article of manufacture in the nature of a piano-playing guide for children that is practical, instructive and educational, as well as amusing and entertaining.

Said article comprises a sheet adapted to be placed on the keys of the key board of a piano and has an upright background on which are words, preferably those of a Mother Goose rhyme or a nursery rhyme, separated into syllables and each syllable having a key designator arranged in order representing a melody to be played on the piano. As a guide for a child to pick out the proper keys on the piano to play the melody, said sheet is provided with finger openings exposing portions of the underlying white keys, and key indicators for said finger openings. To properly position the sheet on the key board with the finger openings over the white key for which they are designated, said sheet is provided with openings for certain of the black keys to fit the sheet therearound.

To play a melody on the piano represented by the key designators for the different syllables of the words, a child, observing the key designator for the first syllable of the words, associates it with the corresponding key indicator on the sheet, and depresses the underlying white key to sound the proper note. This action is repeated until all of the keys have been depressed in the order of the key designators for the different syllables of the words.

Another important feature of the article is the fact that the words or rhyme are illustrated on the background of the article in full colors, thereby visualizing for the child the idea or thought expressed therein. Furthermore, to increase the attractiveness of the article, the background thereof is given the same outline as the illustration thereon and the sheet is outlined to represent the underlying keys.

The new article of manufacture is illustrated in the single perspective view of the accompanying drawing which also diagrammatically illustrates, by means of broken lines, the key board of a piano The numerals 1 and 2 indicate, respectively, the white and black keys of the key board of a piano, and the numeral 3 indicates the back board thereof, all of which are diagrammatically illustrated by means of broken lines.

The new article of manufacture comprises, as shown, a cardboard sheet 4 tht is preferably cloth lined and longitudinally scored at 5 and 6. Said sheet 4 is adapted to be placed on the keys of the key board with its front longitudinal edge portion turned down at the score 5 to afford a stiff flap 7 that overlaps the front ends of the respective white keys 1. This sheet 4 is also turned up at the score 6 to afford a background 8. Longitudinal openings 9 are formed in the sheet 4 for the black keys 2 to fit said sheet therearound and position the sheet 4 on the key board, as will hereinafter appear.

Finger openings 10 are formed in the sheet 4, have the same spacing as the white keys 1 and expose the underlying white keys. As shown, there are eight of these finger openings for one octave of the piano and have individual key indicators 11 in the form of the numerals 1 to 8, inclusive, that appear on the sheet 4 close to said finger openings. Said sheet 4 and its flap 7 are outlined to represent the underlying white keys 1.

Printed on the background 8 is the Mother Goose rhyme "Twinkle, twinkle little star" and indicated by the numeral 12, and the words thereof are separated into syllables, and each syllable given a key designator 13. The key designators 13 are the same numerals as the key indicators 11, and are arranged in order representing the melody to be played by the white keys 1 designated by the indicators 11.

The background 8 is illustrated in full colors around the rhyme 12 to visualize the thought or idea expressed by said rhyme. Said background 8 has the same outline as the illustration thereon.

To play the melody expressed by the key designators 13 the child first observes the key designator "1" over the syllable "Twin" of the rhyme, associates it with the key indicator "1" and depresses the underlying white key through the respective finger opening 10 to sound the correct note. He then observes the key designator "3" over the next syllable "kle" and depresses the white key exposed through the finger opening 10 at the key indicator "3" and so on until he has played the entire melody.

By providing the sheet 4 with the openings 9 for the black keys 2 to fit said sheet therearound, the article is positively and accurately positioned on the keys of the key board with its finger openings 10 positioned over the white keys indicated by the numerals 1 to 8, inclusive. The scored lines 5 and 6 act as hinges to permit the article to be folded flat. When the article is applied to the key board, the background 8 is held in an upright position by the back board 3.

What I claim is:

1. A new article of manufacture comprising a sheet adapted to be placed on the keyboard of a piano to cover certain of the white keys and provided with finger openings having the same spacing as the white keys and exposing the same.

2. The article defined in claim 1 in which the finger openings have key indicators, and in which the sheet has means by which, when said sheet is placed on the keyboard, it will position the finger openings over the white keys designated by the key indicators.

3. The article defined in claim 1 in which the finger openings have key indicators, and in which the sheet is adapted to be fitted over certain of the black keys to position the sheet with the finger openings over the white keys designated by the key indicators.

4. The article defined in claim 1 in which the sheet is outlined to represent the underlying white keys.

5. The article defined in claim 1 in which the finger openings have key indicators, and in which the sheet is provided with black key openings which fit the sheet therearound, and position the same with the finger openings over the white keys designated by the key indicators.

6. The article defined in claim 1 in which the sheet at its front longitudinal edge portion has a depending flap overlapping the respective end portions of the white keys.

7. A new article of manufacture comprising a sheet adapted to be placed on the keyboard of a piano with portions of the underlying white keys exposed and having key indicators for the underlying white keys, and words on the sheet having key designators arranged in order representing a melody to be played on the white keys designated by said indicators.

8. The article defined in claim 7 in which the key indicators and key designators have the same characters.

9. The article defined in claim 7 in which the sheet has a background adapted to be placed in an upright position at the back of the keyboard and on which said words appear.

10. The article defined in claim 7 in which the syllables of the words are separated, and each having one of the key designators.

11. The article defined in claim 7 in which the background of the sheet is illustrated to visualize the thought or idea expressed by the words.

12. The article defined in claim 7 in which the background of the sheet is illustrated to visualize the though or idea expressed by the words, and in which the outline of the background corresponds to the illustration thereof.

13. The article defined in claim 7 in which the sheet is provided with openings for the black keys to fit the sheet therearound, and position the same with the finger openings over the white keys designated by the key indicators.

14. A new article of manufacture comprising a sheet adapted to be placed on the keyboard of a piano and having finger openings exposing portions of the underlying white keys and also having key indicators for the finger openings, said sheet having an upright background and openings for the black keys to fit the sheet therearound and position the same with the finger openings over the white keys designated by said indicators, words on the background with the syllables separated and each syllable having a key designator, the key designators being arranged in order representing a melody to be played on the white keys designated by said indicators, said key indicators and key designators having the same characters, said background being illustrated to visualize the thought or idea expressed by said words.

15. The article defined in claim 14 in which the sheet has a depending flap arranged to extend in front of the white keys.

16. The article defined in claim 14 in which the sheet has a depending flap arranged to extend in front of the white keys, said sheet flap and background being adapted to be folded flat.

In testimony whereof I affix my signature.

GEORGE E. BUZZA.